Oct. 19, 1926.　　　　　　　　　　　　　　　　1,603,908
J. P. CUMMINGS
SPOTLIGHT
Original Filed April 25, 1922　　2 Sheets-Sheet 1
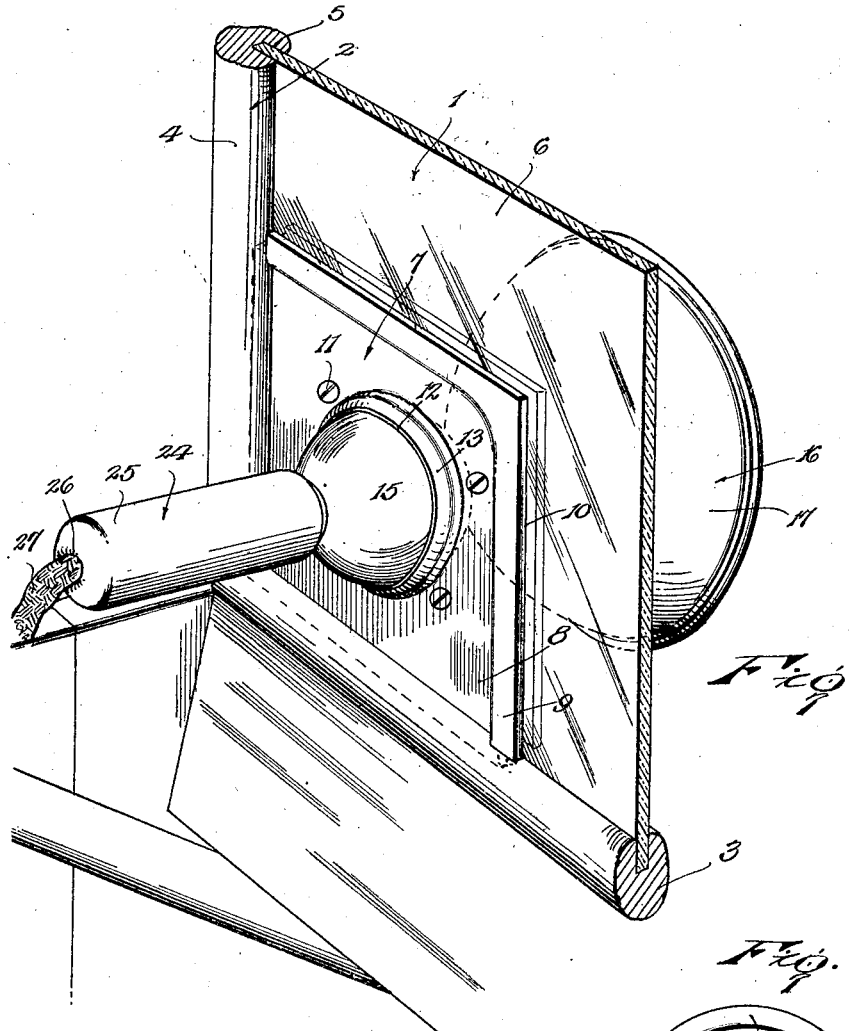
Fig. 1.
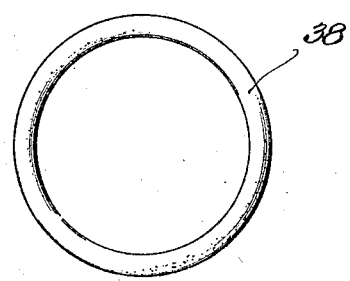
Fig. 6.
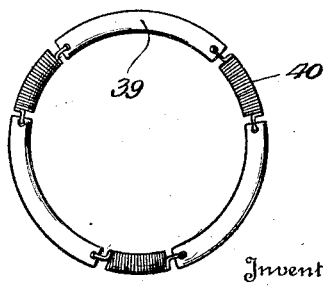
Fig. 7.
Inventor
John P. Cummings.
By , Attorneys Oct. 19, 1926.
J. P. CUMMINGS
1,603,908
SPOTLIGHT
Original Filed April 25, 1922    2 Sheets-Sheet 2
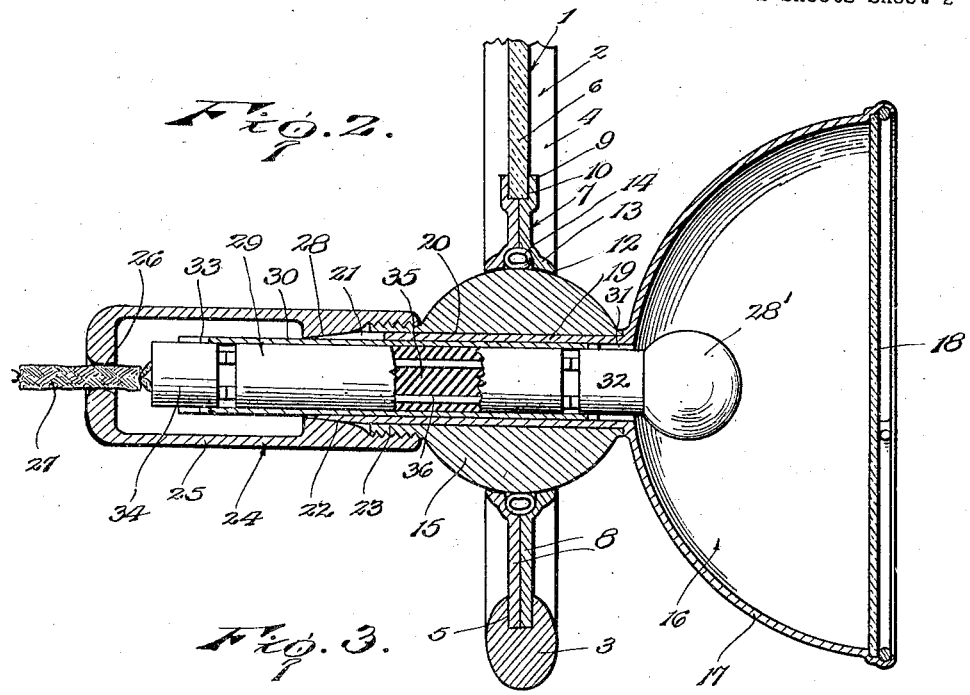
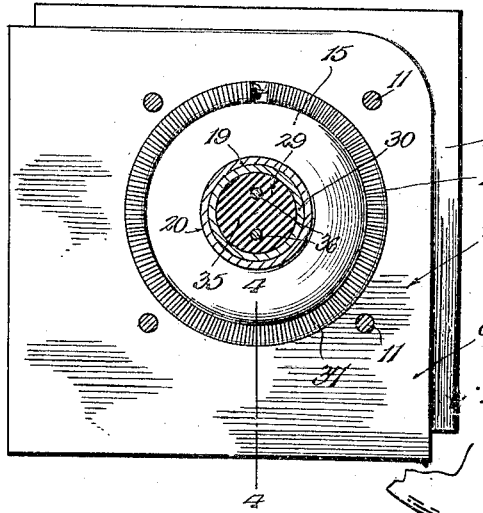
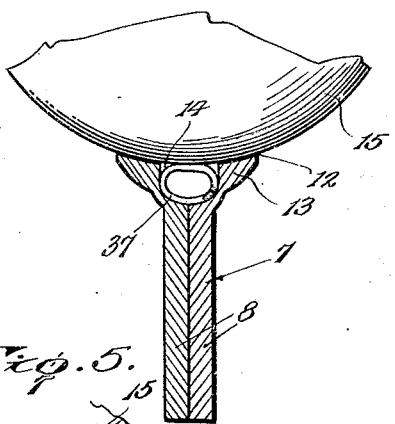
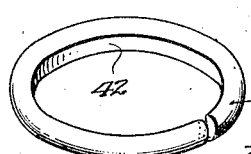
Inventor
John P. Cummings.
By Lacey & Lacey, Attorneys Patented Oct. 19, 1926.

1,603,908

UNITED STATES PATENT OFFICE.

JOHN P. CUMMINGS, OF CHICAGO, ILLINOIS, ASSIGNOR, BY MESNE ASSIGNMENTS, TO FYRAC MANUFACTURING CO., OF ROCKFORD, ILLINOIS, A CORPORATION OF ILLINOIS.

SPOTLIGHT.

Application filed April 25, 1922, Serial No. 556,451. Renewed October 22, 1924.

This invention relates to improvements in spot lights and supporting devices therefor and has as its general object to provide a spot light and support which may be conveniently installed in place within the wind shield of a closed automobile or in the wind shield of an automobile equipped with wind wings or in the wind shield of a touring car where side curtains are employed, the purpose of the invention being to provide for ready and convenient adjustment of the spot light to direct its rays as desired and without regard to the obstruction ordinarily offered by the door pane of a closed car or the wind wing or side curtain of an open car. With this end in view the invention contemplates the provision of a device of this class embodying a supporting socket member or holder adapted to be set into the wind shield section, a ball mounted therein for substantially universal adjustment, means at the forward side of the ball for supporting the spot light proper or, more generally speaking, a light ray projecting device, and means projecting from the rear or opposite side of the ball whereby it may be adjusted so as to present the light ray projecting device in any direction desired.

One of the primary objects of the invention is to provide a novel friction medium for holding the ball in a set position so that while, by means of the handle, the ball may be rotatably adjusted to present the light ray projecting device in any desired direction and held without requiring the manipulation of any other securing means, nevertheless the ball will be firmly and securely held in any position to which it is adjusted, the invention contemplating in this respect the elimination of binding screws or any similar devices which it has heretofore been deemed necessary to employ for securing the light in set positions.

Another object of the invention is to provide a construction adapting the spot light proper to be employed when desired, as a trouble lamp, and likewise to provide novel means whereby the bulb of the spot light may be focused in a convenient manner and without the necessity of acting upon adjusting screws or similar devices as is at present customary.

In the accompanying drawings:

Figure 1 is a perspective view of the spot light embodying the invention installed;

Fig. 2 is a longitudinal sectional view through the spot light;

Fig. 3 is a vertical transverse sectional view taken on a plane between the socket plates of the device;

Fig. 4 is a detail sectional view on the line 4—4 of Fig. 3 with the parts assembled;

Fig. 5 is a view similar to Fig. 4 illustrating the parts about to be assembled;

Fig. 6 is an elevation of a modified form of the friction medium;

Fig. 7 is a similar view illustrating a further modification;

Fig. 8 is a detail view illustrating a further modified form of friction medium.

In the drawings the numeral 1 indicates in general a wind shield section, for example the lower section which comprises the usual frame 2 including the lower rail 3 and stile 4 which frame members are provided with the usual groove 5 receiving the edges of the wind shield pane indicated by the numeral 6. For the purpose of installing the device embodying the invention, the lower left hand corner of the pane 6, in the illustrated embodiment of the invention, is cut away as best shown in Figs. 1 and 2 of the drawings. In other embodiments of the invention a rectangular opening might be formed in one edge portion of the pane 6 as, for example, the lower edge portion and spaced from the adjacent end edge of the pane, but as this and other immaterial modifications fall within the scope of the appended claims, they constitute changes which may be effected without departing from the spirit of the invention.

The device embodying the invention comprises a holding or socket member which is indicated in general by the numeral 7 and which comprises a pair of plates 8 which are of counterpart form and are disposed with their faces in contact as illustrated clearly in Figs. 2 and 4 of the drawings. In the illustrated embodiment, the edges of the plates which, in the installed position of the socket member will constitute the lower and one vertical edge thereof, are left unobstructed so that when the plates are assembled these edges may be disposed within the groove 5 in the lower rail 3 and stile 4, respectively, in the same manner that the corresponding edge portions of the pane 6 are seated in said groove. The upper edges of the plates 7 and their other vertical edges are formed with offset flanges 9 providing between them, in the assembled relation of the plates, a channel 10 of dimensions to accommodate the edges of the cut-away portion of the pane. At this point it will be noted that in installing the device it is only required to cut away one corner of the pane 6 instead of forming an opening in the pane lying wholly within the bounds of the margins thereof so that there is little likelihood of the pane being damaged in the operation, and, furthermore, by reason of the fact that one or more of the edges of the socket member comprising the plates 8 are fitted in the pane receiving groove of one of the members of the frame 2, the wind shield pane is to a great extent relieved of any strains which might otherwise be imposed upon it because of the presence of the device. The plates 8 are secured together in their proper assembled relation, face to face, in any suitable manner, as, for example, by screws or bolts indicated by the numeral 11. The plates are formed in their central portions with openings 12 which are surrounded by retaining elements, in the present instance comprising flanges 13. In the illustrated embodiment these flanges are integral with the plates 8 but they might be otherwise formed to serve the purpose which will presently be explained. The retaining elements, in the present instance the flanges 13, also surround seats 14 formed in the meeting or opposing faces of the plates 8, and the faces of the flanges 13 which are presented to the openings 12, are preferably given the contour of a spherical curve. It will now be evident that when the plates are assembled the flanges 13 will define a socket the wall of which has the contour of a section of a sphere.

The socket member 7 above described constitutes a mounting for the supporting means for the spot light proper and this supporting means includes a ball 15 which is disposed within the openings 12 in the plates 8 at the time of assemblage of the plates. The particular manner in which the ball 15 is supported for universal rotative adjustment within the socket defined by the openings 12 and surrounding flanges 13, will presently be fully described and reference will now be had to the spot light proper and the manner of mounting the same upon or within the said ball.

The spot light proper is indicated in general by the numeral 16 and comprises a reflector shell 17 within the front of which is mounted the usual lens or plain glass 18. At its back the shell 17 is provided with a cylindrical tubular extension 19 which is removably fitted into a diametric bore or opening 20 formed in the ball 15, the extension 19 being of a length to project rearwardly beyond the ball when the spot light 16 is assembled therewith and the said extension has been fitted to the fullest extent into the opening 20. For a purpose to be presently explained, the rear end portion of the extension 19 is formed with longitudinal incisions 21, preferably three in number and equi-distantly spaced, and the extension is exteriorly tapered in the direction of its extremity as indicated by the numeral 22. The ball is provided upon its rear side and at the rear end of the opening 20 with an exteriorly threaded nipple extension 23 on to which may be fitted the forward end of a handle member indicated by the numeral 24 and comprising an exteriorly cylindrical shell 25 closed at its rear end except for an opening 26 through which a conductor wire 27 may be led for supplying current to the headlight bulb which is indicated by the numeral 28′. Interiorly, the shell 25 of the handle member is formed near its forward end and inwardly of its threaded portion which fits the nipple extension 23, with a restricted tapered portion 28 which, when the handle member is threaded on to the nipple extension 23, is designed to ride in engagement with the tapered end 22 of the extension 19 and contract said end about an electrical connection or conduit which is indicated in general by the numeral 29. Said connection or conduit 29 comprises a tubular body 30 which is snugly and yet slidably adjustably fitted into the extension 19 of the spot light shell 17. At its forward end this tubular body 30 is adapted in the usual manner, as indicated by the numeral 31, to receive the base 32 of the bulb 28′. In a like manner the rear end of the tubular body 30 is adapted as at 33 to accommodate a plug connection 34 to which the conductor wires 27 are electrically connected. A core 35 of insulating material is fitted into the tubular body 30, and conductor wires 36 are led through this core and connected with the terminals of the sockets 31 and 33. As stated, the connection or conduit 29 is slidably adjustable through the extension 19 and it will be evident that when the handle member 24 is disengaged from the nipple 23 and slipped backwardly upon the conductor wire 27, the said connection 29 may be bodily adjusted forwardly or backwardly through the extension 19 so as to focus the bulb 28′. It will also be evident at this point that after the connection 29 has been adjusted so as to properly focus the bulb 28′ the handle member 24 may be returned to its proper position and threaded on to the nipple extension 23 whereupon its tapered interior portion 28 will be caused to ride against the tapered surface 22 of the extension 19 and this portion of the extension will be contracted into binding engagement with the exterior surface of the tubular body 30 of the connection 29 thus securing the connection in its position of adjustment. This provides an exceptionally convenient and readily manipulable means for focusing the bulb of the spot light and is quite distinguished from devices in which it is necessary to adjust screws and other mechanical parts in focusing the bulb. At this point it is to be observed that should it be desired to employ the device as a trouble lamp this may be done by unthreading the handle member from the nipple extension 23, disconnecting the plug 34 and then bodily removing the spot light proper from the ball 15 after which the plug 34 may be reinserted into the rear end of the connection 29 or another suitable plug may be so inserted.

Reference will now be made to the means provided for supporting the ball 15 within the socket 7. In the structure as thus far described the ball 15 is so housed or mounted within the socket 7 that it is capable of substantially universal adjustment or setting of the ball, such adjustment being effected through the medium of the handle member 24 and for the purpose of presenting the spot light 16 in any direction desired. However, the present invention contemplates the provision of highly efficient means for maintaining the ball 15 in its various positions of adjustment without however interfering in any way with the immediate and convenient setting of said ball 15 through the medium of the handle member 24, and likewise without the necessity of adjusting any securing devices such as binding screws or the like. With this end in view there is provided a friction medium which is housed within the socket 7 and which coacts with the ball 15. In the embodiment of the invention shown in Figs. 1 to 5, inclusive, this medium comprises an annular helical spring 37 which in its initial form and condition is of a diameter slightly less than that of the ball 15. The seat 14 provided within the socket 7 is of a radial depth slightly less than the cross sectional diameter of the element 37 but of a width slightly greater than said cross sectional diameter and it will be noted by a comparison of Figs. 4 and 5 of the drawings that when the plates comprising the socket 7, together with the element 37 and ball 15 are all assembled and the said plates secured together, the element 37 will be crowded into the seat 14 and will be caused to frictionally bind the ball 15, the latter being, after such assemblage of the parts, supported in a manner to float within the socket and be held in a set position solely by the said element 37. As will be apparent by reference to Fig. 4 and a comparison of this figure with what is shown in Fig. 5, the element 37 is somewhat compressed and its cross sectional contour somewhat changed at the time of assemblage of the parts referred to. It will now be obvious that the ball 15 is supported in a manner to float within the element 37 and be supported solely by said element. It is true that the flanges 13 surround the ball 15 but they are substantially out of contact therewith and do not in themselves constitute a bearing surface for the member. In fact, they serve solely as retainers or a restraining means to prevent forward or rearward displacement of the ball from its socket, and serve no other purpose.

Fig. 6 of the drawings illustrates a modified form of the friction medium and the said medium in this form comprises an annular body 38, circular in cross section, and formed of rubber or a composition of rubber and other materials or of any other substance or material which may be found suitable for the purpose, the body 38 being interiorly and exteriorly of diameters corresponding substantially to the diameters of the coil spring member 37. Fig. 7 of the drawings illustrates a further modification of the frictional medium and in this embodiment said medium consists of arcuate segments 39 of any suitable frictional material such, for example, as fiber, which are connected end to end in an annular series by coil springs 40, the segment 39 likewise having inner and outer diameters corresponding to those of the coil spring 37. Fig. 8 of the drawings illustrates a still further modification of the frictional medium which comprises a split annular body 41 of spring steel or other resilient material having its outer sides of approximately circular contour in cross section and in its inner side or periphery concaved as at 42 to conform to the spherical contour of the ball 15.

It will be observed that in all embodiments of the invention, the friction medium is resilient and contractible and circumferentially encompasses the ball and supports the same as well as binding thereagainst with sufficient firmness to retain it in any position to which it may be adjusted. Therefore, the ball may be said to float within the circumference of and upon the friction medium whether it be of one form or another. In the forms illustrated in Figs. 4, 6 and 7 of the drawings the said medium is also compressible to a greater or less degree.

Having thus described the invention, what is claimed as new is:

1. A spotlight support comprising a socket having an opening and a surrounding seat, a spotlight carrying ball disposed in the opening in the socket, and a frictional holding medium housed in the seat in the socket and encircling the ball and having a cross sectional dimension in the plane of the seat greater than the depth of the seat whereby to bind between the base of the seat and the ball and hold the ball in a set position.

2. In a device of the class described, a socket, a ball therein, a tubular member fitted through the ball and having a divided end portion, a handle member on the ball fitting said portion to contract the same, and a light bulb support adjustably mounted in said tubular member and held in a set position by the contraction of said portion thereof.

3. In a device of the class described, a socket, a ball therein, a tubular member fitted through the ball and having a contractible end portion, a light bulb support slidably mounted in said tubular member and of a length to project at one end beyond the corresponding end of the member whereby force may be applied to said end to adjust the support, and a hollow handle projecting from the ball and constructed interiorly to bind the contractible portion of the tubular member about the light bulb support and thereby hold the latter in a set position.

4. In a device of the class described, a socket, a ball therein, a tubular member fitted through the ball and having a split contractible portion, a light bulb support slidably mounted in said tubular member, a reflector carried by the end of the tubular member remote from the contractible portion thereof, the ball having a threaded extension encircling said tubular member, and a handle member threaded on to said extension and coacting with the contractible portion of the tubular member for binding the same about the light bulb support to hold the latter in a set position.

5. In a device of the class described, a socket, a ball therein having an opening therethrough, a reflector shell having a tubular extension removably fitted through said opening and provided with a contractible end, a light bulb support comprising a body slidably fitted in the extension and adapted at its end adjacent the reflector shell for the support of a light bulb, the body being adapted at its opposite end for the attachment of an electrical conductor and projecting at its latter end beyond the corresponding end of the tubular extension of the reflector shell, and a handle projecting from the ball and enclosing the contractible end of the tubular extension and the projecting end of the slidable body whereby to frictionally bind the contractible end of the extension about the projecting end of the body and hold the body in a set position.

6. A spot light support comprising a socket consisting of counterpart plates secured together with their inner faces in contact and having circular openings centrally therethrough and provided with lateral retainers on their outer faces at the walls of said openings, the walls of the openings forming an annular seat having a width greater than its depth, a ball disposed through the said circular openings, and an annular contractible member housed in said seat and surrounding and bearing upon the ball, the normal internal diameter of the said member being less than the diameter of the ball and the radial cross sectional diameter of the member being less than the width of the seat but greater than the depth of the same.

7. In a spotlight, a socket adapted to be mounted in a windshield and provided with an internal annular recess extending around the interior of the socket, a spotlight supporting ball adjustably carried by said socket, a spotlight and a handle for manipulating said ball carried by said ball on opposite sides of said socket, and resilient means comprising a coiled spring disposed on its side in said recess and around the interior of said socket yieldably engaging the surface of said ball at a plurality of points for frictionally retaining said ball in adjusted position.

8. A spotlight comprising, a socket member adapted to be mounted in an opening in a windshield, a ball supported by said socket, a handle and a lamp carried by said ball at opposite sides respectively of the windshield, and a coiled spring interposed between said ball and socket and circumferentially of said socket and normally compressed between the ball and socket for frictionally holding said ball in adjusted position.

In testimony whereof I affix my signature.

JOHN P. CUMMINGS.